June 10, 1969   P. Z. KIRALY   3,448,488
QUICK ADJUSTMENT KNOCK-OUT ROD
Filed Jan. 11, 1967
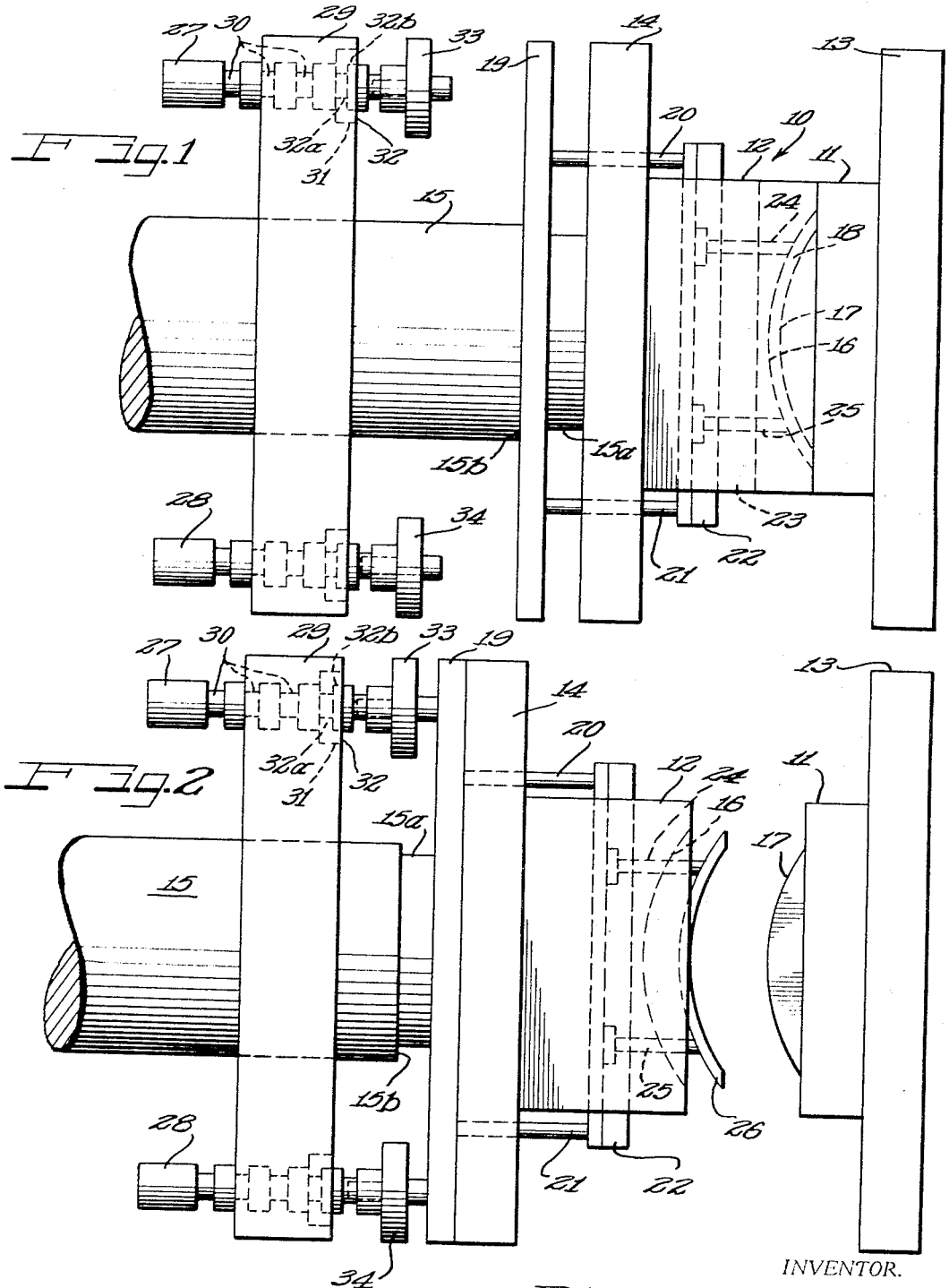
INVENTOR.
Philip Z. Kiraly
ATTORNEYS

United States Patent Office 3,448,488
Patented June 10, 1969

3,448,488
QUICK ADJUSTMENT KNOCK-OUT ROD
Philip Z. Kiraly, West Chester, Pa., assignor to Beloit Eastern Corporation, Downingtown, Pa., a corporation of Delaware
Filed Jan. 11, 1967, Ser. No. 608,641
Int. Cl. B29f 1/14
U.S. Cl. 18—2                    10 Claims

ABSTRACT OF THE DISCLOSURE

This disclosure is directed to quick adjusting knock-out rods which have particular utility when used in conjunction with injection molding machines. The knock-out rod disclosed herein is preferably formed of a round bar having a plurality of annular notches or undercuts formed at uniform intervals along the length of the bar. The knock-out rod passes through a stationary platen and is retained in position relative to the stationary platen by a split collar. The split collar is designed to be inserted into the stationary platen in more than one orientation thereby effecting adjustment of the knock-out rod a distance and interval less than the distance between the adjacent notches on the rod. Additionally, the quick adjusting knock-out rod disclosed herein is provided with means for fine adjustment of the overall length of the rod.

---

In general, the art of injection molding is well known. A mold, usually comprised of two parts having mating spaced apart surfaces to form a cavity for receiving injection material, forms the major component of the injection molding machine. Usually, one of the mold parts is movable relative to the other to facilitate removal of the article of manufacture which is formed within the mold. The movable mold is provided with an ejector for removing the article of manufacture from the mold surface.

Heretofore, adjustable ejector actuating means have been provided to actuate the ejector at a certain position of travel of the movable mold. Such ejector actuating means of the prior art have been of the threaded bar type which are threadedly secured to a stationary portion of the injection molding machine. When the molds of the injection molding machine are changed to manufacture different articles, it is often necessary to also change the position of the threaded bar to insure that the ejector is actuated properly. This bar, referred to hereinafter as a knock-out rod, must be unfastened from its locked position and threadedly adjusted to vary its length and then again locked in place. However, it is common to utilize two or more knock-out rods to effect proper ejection of an article of manufacture. Therefore, each knock-out rod must be accurately adjusted so as to work together. In so adjusting the position of the knock-out rods of the prior art, a time interval of approximately 45 minutes is required to adjust the length of the rod over a distance of 30 inches.

Therefore, one of the primary objects of the present invention, particularly from a maintaining standpoint, is to provide a knock-out rod for injection molding machines which can be adjusted accurately over short and long lengths in a minimum of time.

Another object of the present invention is to provide a knock-out rod for injection molding machines which has a finite number of adjustable positions, and an infinite number of adjustable positions in between each finite position.

A feature of the present invention is in the provision of an adjustable knock-out rod having a plurality of annular recesses or undercuts along the axial length of the rod. The undercuts are spaced at even intervals along the length of the rod, and the rod is held in position in an apertured platen by a split collar. The split collar has a radially inwardly extended portion to engage the selected one of the notches on the rod, and an axially extended annular portion around the periphery of the collar. The axially extended portion of the collar is equal in length to the axial width to the radially inwardly extended portion. Therefore, a collar of this construction provides additional adjustment of the knock-out rod by being able to position the rod in two respective positions for each notch on the rod. To obtain an infinite number of adjustable positions between each finite number of positions, the rod is provided with a threaded end cap.

Other features and advantages will be more fully realized and understood from the following detailed description when taken in conjunction with the accompanying drawings wherein like reference numerals throughout the various views of the drawings are intended to designate similar elements or components and wherein:

FIGURE 1 is an elevational view showing a portion of an injection molding machine equipped with the knock-out rods of the present invention; and FIGURE 2 is an elevational view similar to that of FIGURE 1 showing the ejection position of the machine.

As seen in FIGURES 1 and 2, a mold designated generally by reference numeral 10 is formed of a stationary mold portion 11 and a movable mold portion 12. The stationary mold portion 11 is secured to a stationary platen 13 which is mounted on an injection molding machine. On the other hand, the movable mold portion 12 is mounted on the platen 14 which, in turn, is secured to a ram 15 or other motive means.

The movable mold portion 12 has a forming surface 16 which is positionable adjacent but spaced from a forming surface 17 formed on the stationary mold 11. The forming surfaces 16 and 17 define a chamber 18 for receiving material which is injected into the chamber 18 by suitable means.

An ejector bar 19 is movably secured to the ram 15 about an undercut 15a and engageable with a shoulder 15b. A pair of extended pins 20 and 21 are secured to the ejector bar 19 and extend through apertures in the movable platen 14. Suitable bias means may be provided between the platen 14 and the ejector bar 19 to bias the bar 19 in a direction away from the platen 14.

Secured to the other ends of the pins 20 and 21 is a bar 22 which is positioned within an opening 23 formed in the movable mold 12. Secured to the bar 22 is a pair of ejectors 24 and 25 which extend through the movable mold 12 and terminate at the forming surface 16. The terminating ends of the ejectors 24 and 25 are preferably fashioned to conform to the forming surface 16.

After the chamber 18 has been purged of material to form an article of manufacture 26, the ram 15 is carried in a direction away from the stationary mold 11, as seen in FIGURE 2, to cause the ejector bar 19 to urge the ejectors 24 and 25 in a direction to remove the article of manufacture 26 from the surface 16.

In the manufacture of molded articles, it is often necessary from time to time to change the distance of travel of the movable mold portion 22 to provide proper clearance between the two halfs of the mold to effect proper ejection of the article of manufacture 26. Therefore, a pair of quick adjustable knock-out rods 27 and 28 are secured to a stationary platen 29 which, in turn, is secured to the injection molding machine. As the ram 15 draws the movable mold portion 12 away from the mold portion 11, to open the molding chamber 18, the ejector bar 19 engages the knock-out rods 27 and 28 to cause the ejectors 24 and 25 to move outwardly.

The construction of the knock-out rods 27 and 28 are identical, and therefore a detailed description will be given only of the knock-out rod 27. The knock-out rod 27 is provided with a plurality of annular recesses or undercuts 30 which are spaced along the axial length of the rod 27. Preferably, the recesses 30 are spaced at even intervals along the length of the rod.

A counterbore 31 is provided within the platen 29 and about the rod 27. To secure the rod 27 to the platen 29, a split collar 32 is placed around the rod 27 and into one of the recesses 30 and the collar and rod are moved in a direction to insert the collar into the counterbore 31. The collar 32 may be held in place by suitable means such as a set screw. In the preferred embodiment of the present invention, the collar 32 has a radially inwardly extended portion 32a which fits snugly into a selected one of the recesses 30. Also, the collar 32 is provided with an axially extended portion 32b which overlies the major diameter of the rod 27 and extends along the axis thereof a distance equal to the axial length of the recess 30. Therefore, by utilizing the split collar of the present invention the knock-out rod 27 may be positioned in two different axial positions by utilizing the same notch. That is, when the collar 32 is inserted into the notch 30, as shown on the drawings, the axial length of the shaft 27 is as shown. However, when the collar 32 is turned around so that the axially extended annular portion 32b is in the opposite direction, the axial length of the rod 27, extending toward the ejector bar 19, will be increased. In the preferred embodiment, the axial extent of the annular portion 32b is approximately equal to the axial extent of the notch 30. Furthermore, the axial extent of the notch 30 is preferably equal to one-half the axial extent of the land portions between each of the notches 30. By way of example, the axial extent of each of the land portions between the notches 30 may be 1½ inches and the axial extent of each of the notches 30 may be ¾ of an inch. Therefore, the axial extent of the portion 32b is ¾ of an inch, and the axial extent of the radially inward portion 32a is ¾ of an inch, thereby providing an overall collar thickness of 1½ inches.

By utilizing the knock-out rod of the present invention in conjunction with the collar construction shown, the axial length of the knock-out rod, extending toward the ejector bar 19, may be adjusted quickly and easily. Furthermore, the extent of adjustment, afforded by the notches 30 and the collar 32, is as small as ¾ of an inch, and as large as the entire length of the rod 27. To provide a fine adjustment of the length of the rod, extending toward the ejector 19, an end cap 33 is threadedly secured to the end of the rod 27. Similarly, an end cap 34 is secured to the end of the rod 28. Therefore, the end caps 33 and 34 provide an infinite number of positions between each finite number of positions to which the rod can be adjusted.

Therefore, the present invention has provided a new and improved means for quickly adjusting the length of a knockout rod used in conjunction with an injection molding machine and it will be understood that variations and modifications may be effected without departing from the spirit and scope of the novel concepts of this invention.

I claim as my invention:

1. In an injection molding machine including:
a mold having an inner forming surface;
means for injecting material into said mold in contact with said forming surface to form an article of manufacture;
means for opening said mold and disengaging a portion of the article of manufacture from said forming surface;
ejector means carried by said mold, said ejector means including means extending through a portion of the forming surface of said mold and engageable with the portion of the article of manufacture remaining in contact with said forming surface, said ejector means being movable relative to said mold;
the improvement therein comprising, a stationary platen mounted in spaced relation with said ejector means;
at least one knock-out rod passing through said platen and extending toward said ejector means, said rod having notches formed therein; and
retainer means engageable with said stationary platen and one of said notches for removably securing said rod to said platen, whereby the length of said rod extending toward said ejector means can be selected to effect proper ejection of the article of manufacture.

2. An injection molding machine according to claim 1 wherein said notches are formed at uniform intervals along the axial length of said rod.

3. An injection molding machine according to claim 1 wherein said retainer means is a split collar which is engageable with one of said notches and said stationary platen.

4. An injection molding machine according to claim 3 wherein said collar has a radially inwardly extended portion for engaging one of said notches and an annular axially extended portion having an axial length equal to the axial width of said radially inwardly extended portion.

5. An injection molding machine according to claim 4 further including a threaded end cap threadedly secured to the end of said rod extending toward said ejector means to provide fine adjustment of the overall length of said rod.

6. In an injection molding machine including:
a mold having a stationary forming surface and a movable forming surface;
motive means for moving said movable forming surface toward and away from said stationary forming surface;
ejector means mounted for movement with said motive means and movable relative to said motive means;
pin means secured to said ejector means and extendable through said movable forming surface when said ejector means moves relative to said motive means when said movable forming surface is moving away from said stationary forming surface;
the improvement therein comprising, an apertured platen mounted in spaced relation to said ejector means;
means supported on said platen and extending toward said ejector means for engaging said ejector means and moving said ejector means relative to said motive means when said movable forming surface is moving away from said stationary forming surface;
said means supported on said platen having a plurality of stop stations therealong; and
means engaging said stop stations for removably securing said means supported on said platen to said platen in a finite number of positions to effect a finite number of ejection positions of said ejector means.

7. An injection molding machine according to claim 6 further including means adjustably secured to said means supported on said platen to provide an infinite number of ejection positions between each finite ejection position of said ejector means.

8. An injection molding machine according to claim 6 wherein said means supported on said platen toward said ejector means is a rod and wherein said plurality of stop stations are recesses formed along the axial length of said rod, said recesses being spaced at uniform intervals along the length of the rod; and wherein said means for removably securing the rod to said platen is a split collar having a portion thereof selectively engageable with one of the recesses of said rod.

9. An injection molding machine according to claim 8 wherein said split collar is formed of a radially inwardly extended portion and an annular axially extended portion radially outwardly of said radially inwardly extended portion.

10. An injection molding machine according to claim 9 wherein the axial length of said axially extended portion is equal to the axial width of said radially inwardly extended portion.

References Cited

UNITED STATES PATENTS

| | | |
|---|---|---|
| 2,645,815 | 7/1953 | Tuarnstrom. |
| 2,689,978 | 9/1954 | Roger. |
| 2,711,561 | 6/1955 | Sudli. |
| 2,834,989 | 5/1958 | Kuanery. |
| 3,049,758 | 8/1962 | Drevlas. |
| 3,120,039 | 2/1964 | Stubbe et al. |
| 3,137,905 | 6/1964 | Steinman et al. |
| 3,161,918 | 12/1964 | Zearbaugh. |
| 3,252,180 | 5/1966 | Houk. |
| 3,310,842 | 3/1967 | Fischbach. |
| 3,315,302 | 4/1967 | Phillipson et al. |

J. HOWARD FLINT, JR., *Primary Examiner.*

U.S. Cl. X.R.

18—42; 249—68